(12) United States Patent
Duan et al.

(10) Patent No.: US 8,240,007 B2
(45) Date of Patent: Aug. 14, 2012

(54) HINGE ASSEMBLY FOR FOLDABLE ELECTRONIC DEVICE

(75) Inventors: Chao Duan, Shenzhen (CN); Chia-Hua Chen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 390 days.

(21) Appl. No.: 12/484,325

(22) Filed: Jun. 15, 2009

(65) Prior Publication Data

US 2010/0107366 A1 May 6, 2010

(30) Foreign Application Priority Data

Oct. 31, 2008 (CN) .......................... 2008 1 0305326

(51) Int. Cl.
*E05D 11/10* (2006.01)
(52) U.S. Cl. ......... 16/330; 16/303; 16/342; 379/433.13; 455/575.3
(58) Field of Classification Search ............... 16/330, 16/303, 341, 342, 386, 297, 319, 337; 379/433.13; 455/575.3; 361/679.27
See application file for complete search history.

(56) References Cited

U.S. PATENT DOCUMENTS

| | | | | |
|---|---|---|---|---|
| 6,065,187 A * | 5/2000 | Mischenko | ...................... | 16/341 |
| 7,100,244 B2 * | 9/2006 | Qin et al. | ........................ | 16/330 |
| 7,107,648 B1 * | 9/2006 | Lu et al. | ........................ | 16/330 |
| 7,173,825 B2 * | 2/2007 | Han et al. | ....................... | 361/725 |
| 7,383,618 B2 * | 6/2008 | Lu et al. | ........................ | 16/330 |
| 7,552,512 B2 * | 6/2009 | Duan et al. | ...................... | 16/330 |
| 7,565,717 B2 * | 7/2009 | Duan et al. | ...................... | 16/303 |
| 7,578,030 B2 * | 8/2009 | Duan et al. | ...................... | 16/330 |
| 7,665,184 B2 * | 2/2010 | Duan et al. | ...................... | 16/330 |
| 7,853,009 B2 * | 12/2010 | Moskowitz et al. | ..... | 379/433.12 |
| 2005/0257343 A1 * | 11/2005 | Gupte | ............................. | 16/330 |
| 2006/0117527 A1 * | 6/2006 | Tu et al. | ........................ | 16/303 |
| 2006/0117528 A1 * | 6/2006 | Duan et al. | ...................... | 16/303 |
| 2006/0117529 A1 * | 6/2006 | Duan et al. | ...................... | 16/303 |
| 2009/0300882 A1 * | 12/2009 | Hayashi | .......................... | 16/303 |

FOREIGN PATENT DOCUMENTS

CN 1536237 A 10/2004

* cited by examiner

*Primary Examiner* — William L. Miller
(74) *Attorney, Agent, or Firm* — Altis Law Group, Inc.

(57) ABSTRACT

A hinge assembly includes a shaft, a cam, a follower, and an resilient member. The cam, the follower, and the resilient member are mounted with the shaft in turn. One end of the cam has a first outer cam portion and a first inner cam portion. One end of the follower has a second outer cam portion and a second inner cam portion respectively engaging with the first outer and inner cam portions. The resilient member is contained in such a manner that the cam portions of the follower resist the cam portions of the cam due to the decompression of the resilient member, and when the follower is manually rotated relative to the cam about a small original angle, the follower is automatically rotated relative to the cam due to the decompression of the resilient member.

12 Claims, 8 Drawing Sheets

HINGE ASSEMBLY FOR FOLDABLE ELECTRONIC DEVICE

BACKGROUND

1. Technical Field

The present invention generally relates to hinge assemblies and, more particularly, to a hinge assembly for hinging together housings of foldable electronic devices such as mobile telephones, electronic notebooks, and so on.

2. Description of Related Art

With the development of the technologies of wireless communication and information processing, portable electronic devices such as mobile phones and notebooks are now widely used. Foldable electronic devices are particularly favored by consumers for their convenience. Generally, foldable electronic devices have a main body and a cover. Various types of hinge assemblies are used to join the main body and the cover of the foldable electronic device, so that the cover can unfold from and fold on the main body.

A conventional hinge assembly includes a shaft, a cam, a follower engaging with the cam, and a spring. The cam, the follower, and the spring are mounted on the shaft. However, when using such a hinge assembly, a cover generally is manually rotated to a relative large angle, for example, 70-80 degrees, relative to the main body, before the cover can automatically open.

Therefore, there is room for improvement within the art.

BRIEF DESCRIPTION OF THE DRAWINGS

Many aspects of the present hinge assembly for foldable electronic device can be better understood with reference to the following drawings. The components in the drawings are not necessarily drawn to scale, the emphasis instead being placed upon clearly illustrating the principles of the present hinge assembly for foldable electronic device. Moreover, in the drawings, like reference numerals designate corresponding parts throughout the several views.

DETAILED DESCRIPTION

Figure 1:
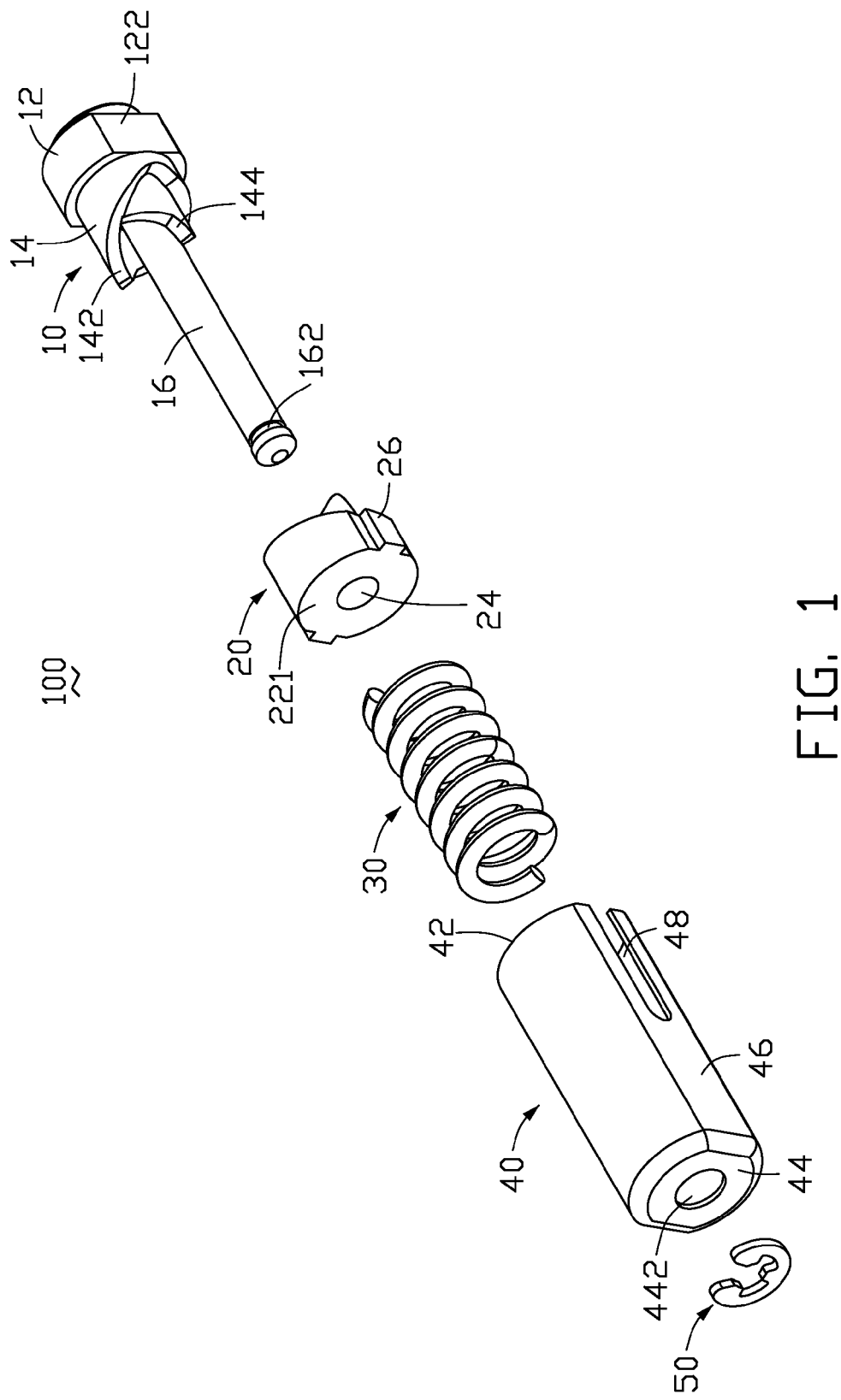
FIG. 1 is an explored, isometric view of a hinge assembly, according to an exemplary embodiment.
Figure 2:
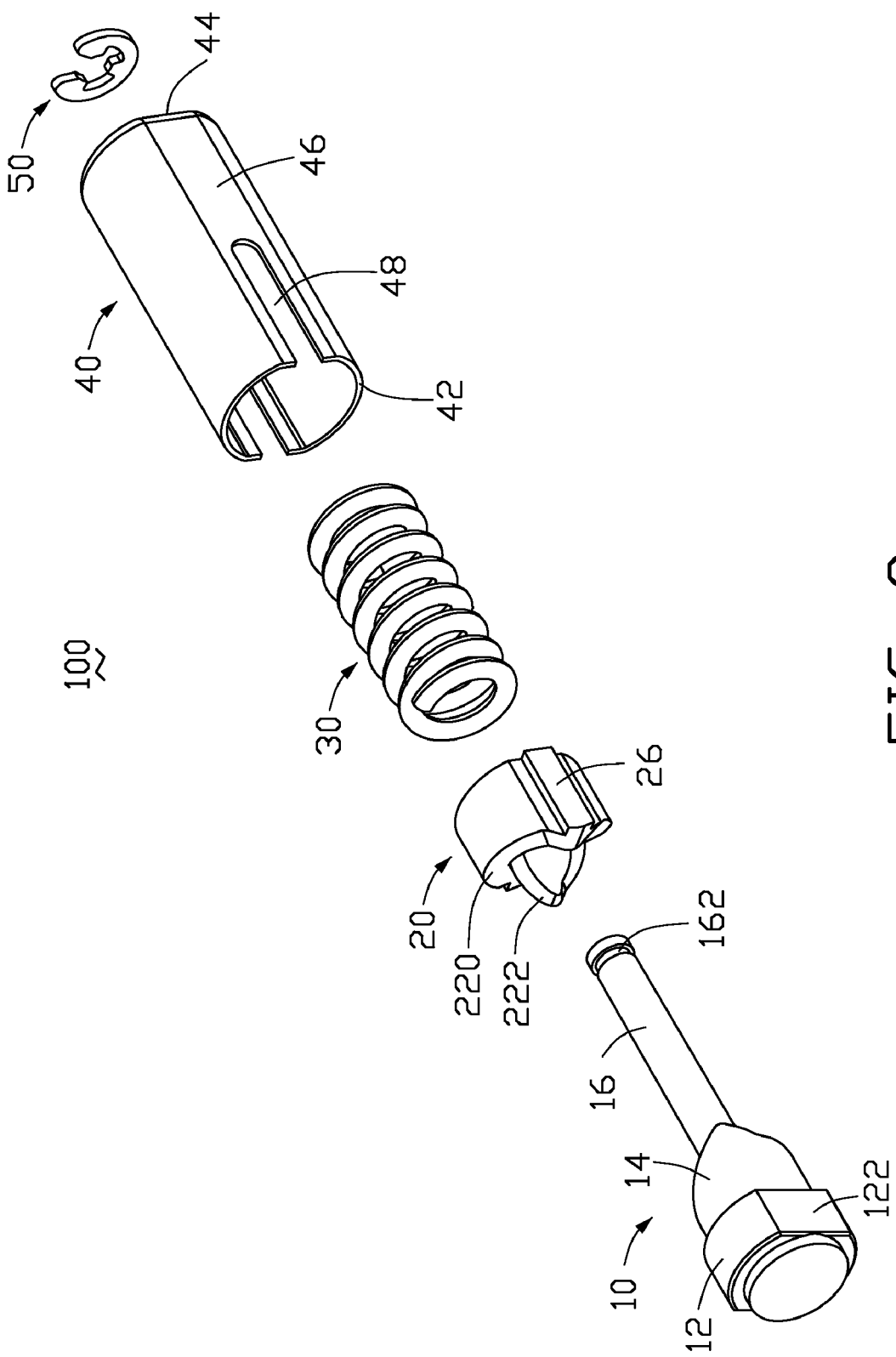
FIG. 2 is similar to FIG. 1, but viewed from another angle.
Figure 7:
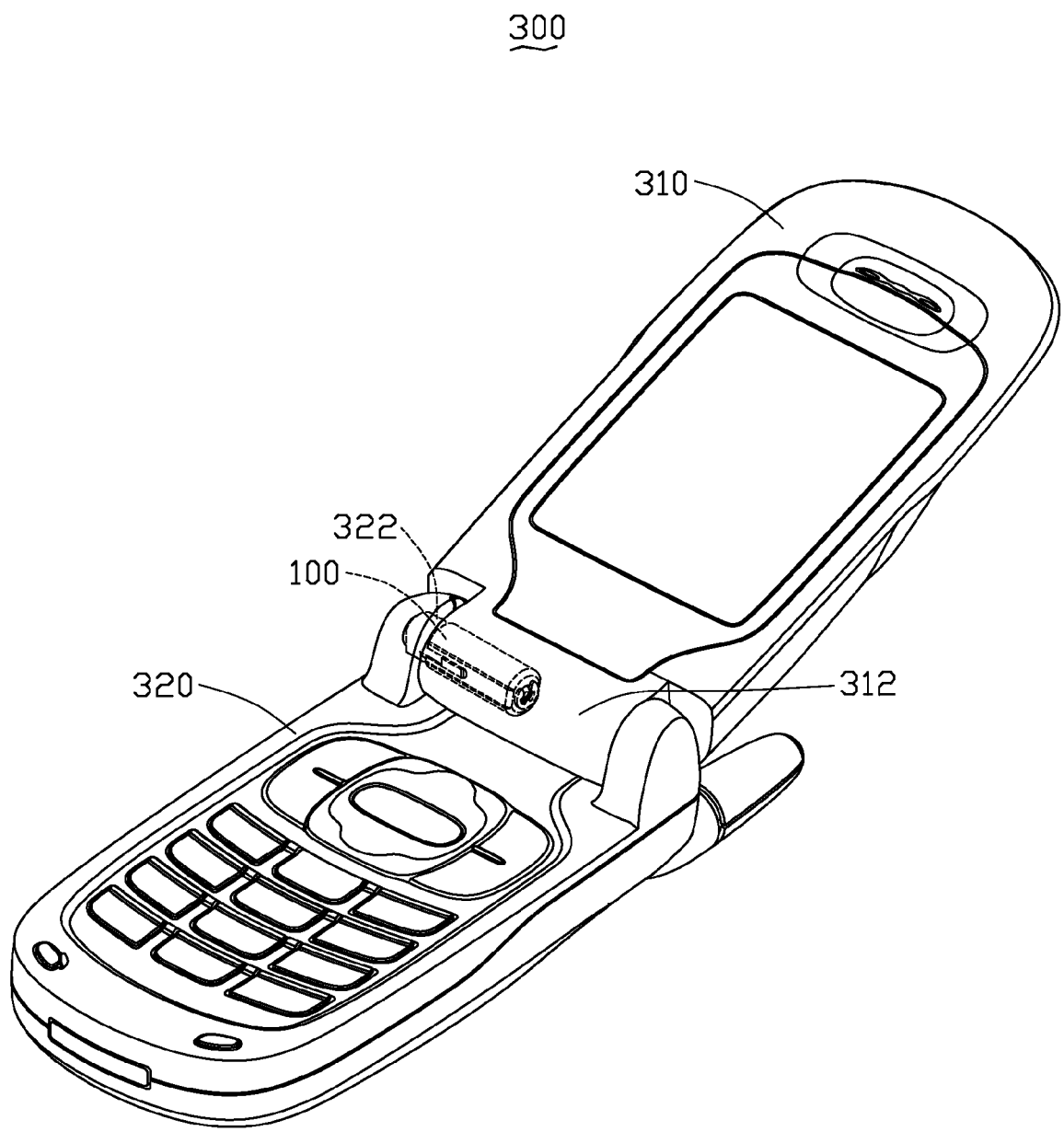
FIG. 7 is an isometric view of a foldable electronic device with the hinge assembly shown in FIG. 1.

FIGS. 1-2 show a hinge assembly 100 according to an exemplary embodiment of the present hinge system. Referring to FIG. 7, the hinge assembly 100, in the embodiment illustrated, is used to interconnect a main body 320 and a cover 310 of a foldable electronic device 300. The cover 310 has a hinge barrel 312 formed at one end. The main body 320 defines a mounting hole 322 in one end. The hinge assembly 100 includes a main body drive member 10, a follower 20, a resilient member 30, a cover drive member 40, and a disk 50. The main body drive member 10 extends through the follower 20, the resilient member 30, the sleeve 40, and the disk 50, thereby integrating the hinge assembly 100 into a complete unit. While the hinge assembly 100 is shown incorporated into the foldable electronic device 300, it is to be understood that the hinge assembly 100 or obvious variations thereof may prove useful in other work environments (e.g., cabinet doors) as well.

The main body drive member 10 includes a fixing portion 12, a cam 14, and a cylindrical shaft 16. The fixing portion 12 and the cam 14 are formed at an end of the shaft 16, and an annular groove 162 is formed at an opposite end of the shaft 16 from the fixing portion 12. The fixing portion 12 is a substantially cylindrical and has two symmetrical flat surfaces 122. The fixing portion 12 engages with the main body 320 of the foldable electronic device 300 so that the main body drive member 10 rotates with the main body 320.

Figure 3:
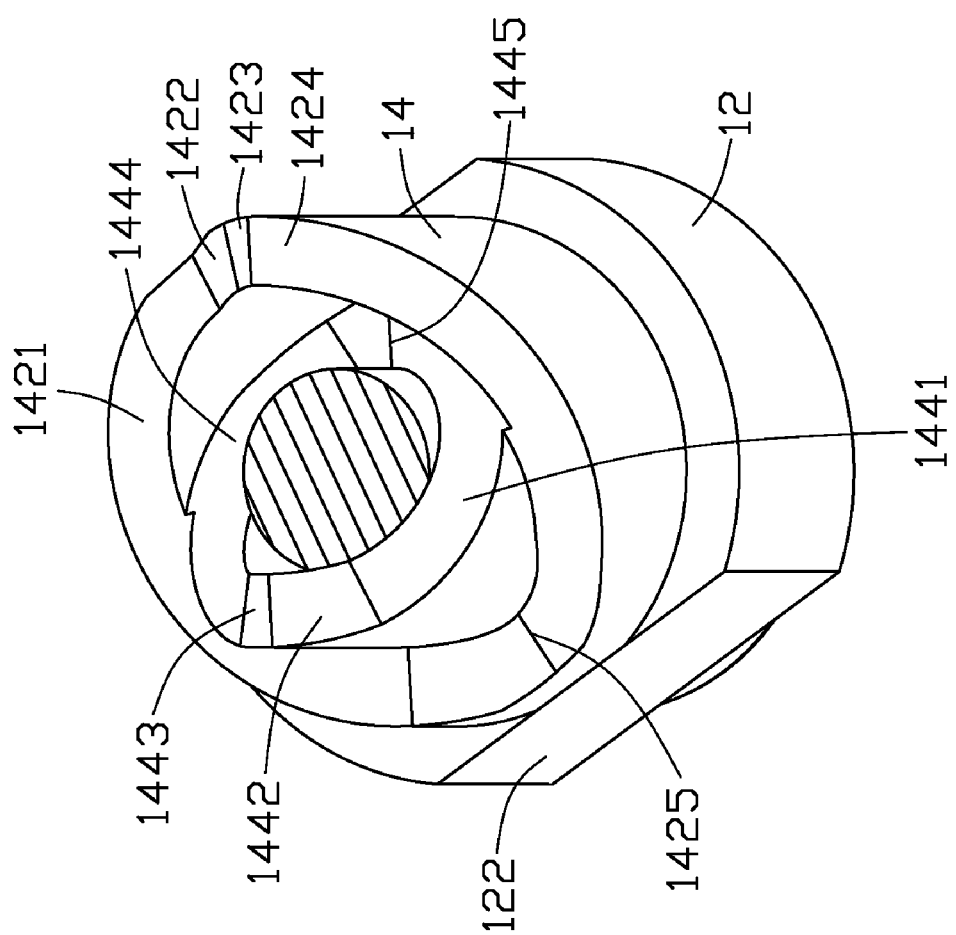
FIG. 3 is a partially, cut-away view of the main body drive member of the hinge assembly shown in FIG. 1.

Referring to FIG. 3, the cam 14 extends from an end of the fixing portion 12 and may be either integrally or separately attached with the main body drive member 10. A diameter of the cam 14 is smaller than the diameter of the fixing portion 12. The cam 14 includes a first outer cam portion 142 and a first inner cam portion 144. The first outer cam portion 142 and the first inner cam portion 144 are both substantially cylindrical. The first outer cam portion 142 has a beginning slope 1421, a resisting slope 1422, a peak 1423, a guiding slope 1424, and a valley 1425. The first inner cam portion 144 has a beginning slope 1441, a resisting slope 1442, a peak 1443, a guiding slope 1444, and a valley 1445. The peak 1423 and the peak 1443 are aligned on opposite sides of the cam 14. The valley 1425 and the valley 1445 are aligned on opposite sides of the cam 14.

Figure 4:
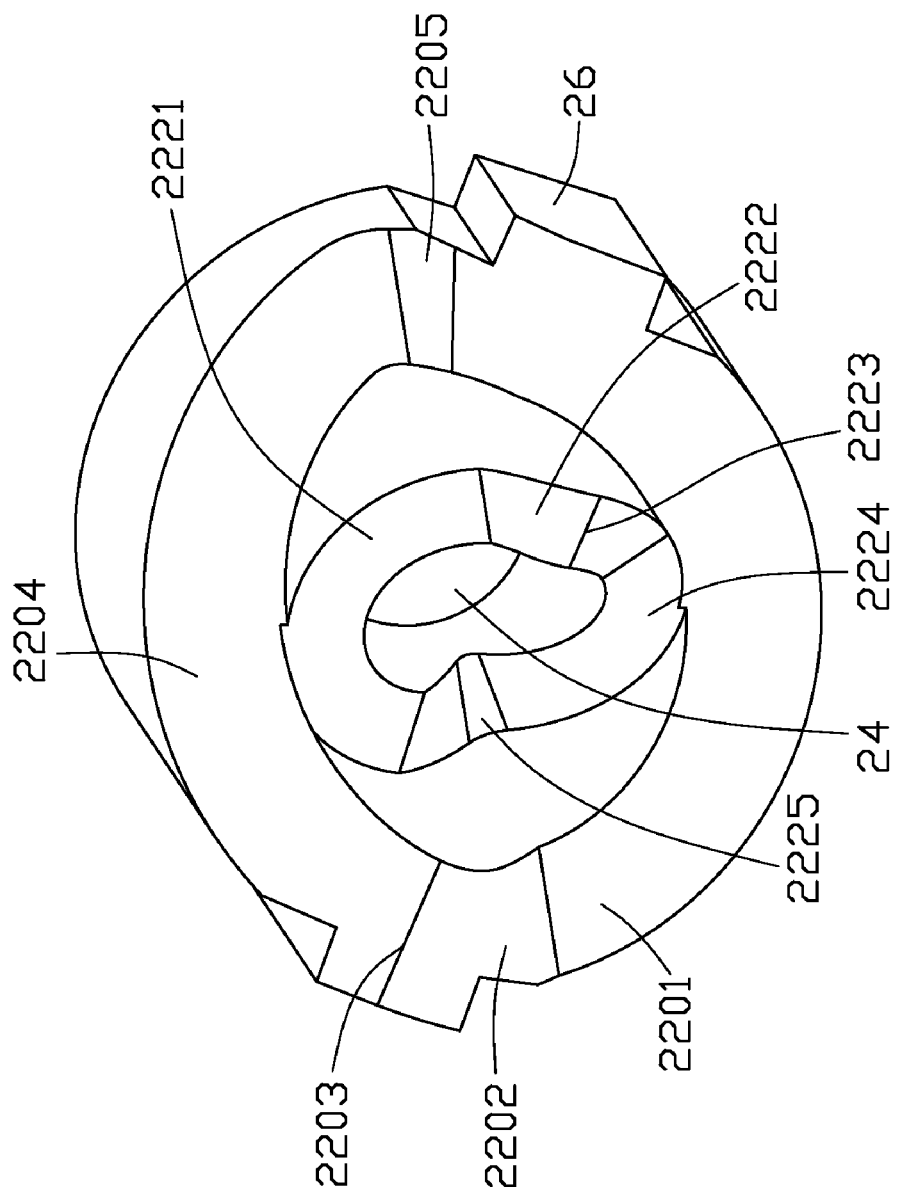
FIG. 4 is an enlarged, isometric view of the follower of the hinge assembly shown in FIG. 1.
Figure 5:
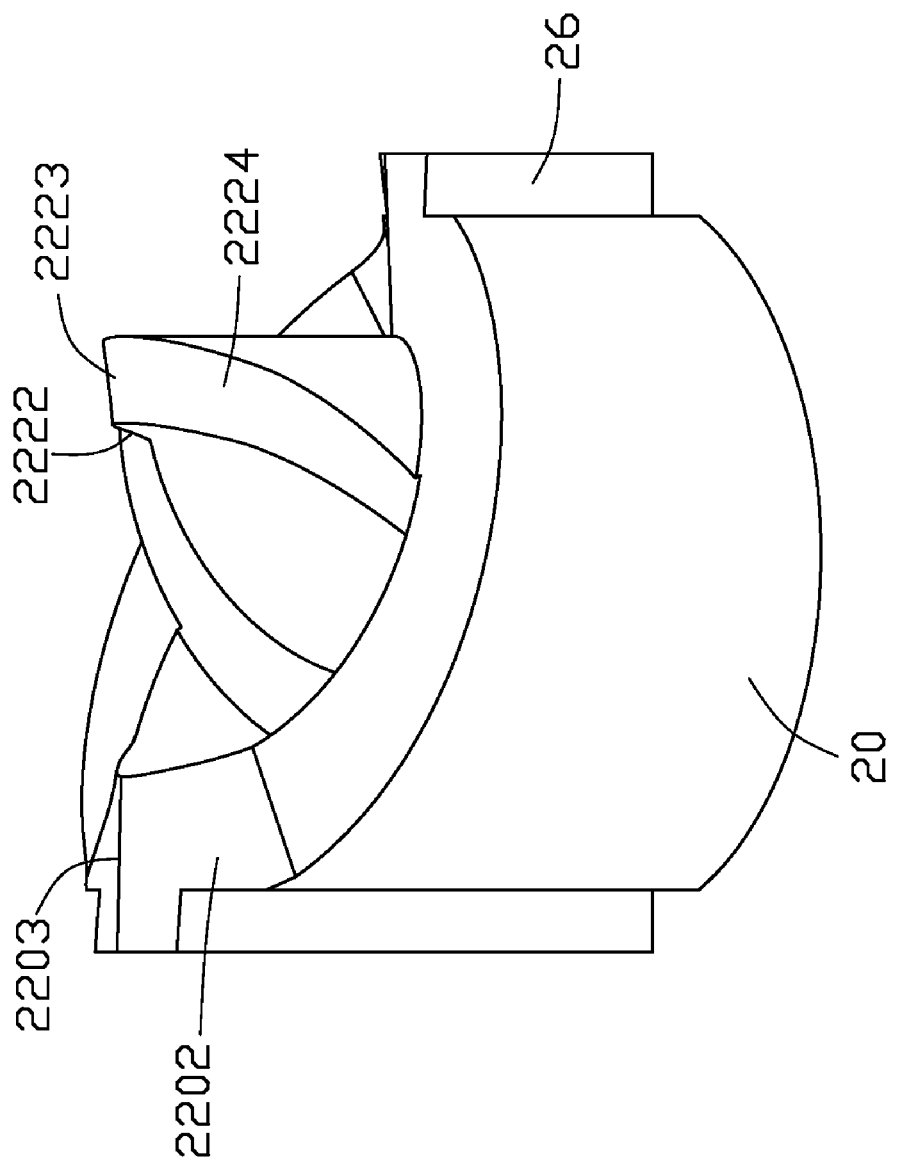
FIG. 5 is similar to FIG. 4, but viewed from another angle.

Also referring to FIGS. 4 and 5, the follower 20 is substantially cylindrical. One end of the follower 20 has a second outer cam portion 220 and a second inner cam portion 222. The other end of the follower 20 has a flat end surface 221. The second outer cam portion 220 and the second inner cam portion 222 respectively engage with the first outer cam portion 142 and the first inner cam portion 144. The second outer cam portion 220 has a beginning slope 2201, a resisting slope 2202, a peak 2203, a guiding slope 2204, and a valley 2205. The second inner cam portion 222 has a beginning slope 2221, a resisting slope 2222, a peak 2223, a guiding slope 2224, and a valley 2225. The peak 2203 and the peak 2223 are aligned on opposite sides of the follower 20. The valley 2205 and the valley 2225 are aligned on opposite sides of the follower 20. The follower 20 defines a circular hole 24 through a center for the shaft 16 travelling through. The follower 20 has two sliding protrusions 26 formed on opposite sides of the peripheral wall.

The resilient member 30 is a coil spring in the present embodiment. An inner diameter of the resilient member 30 is larger than an outer diameter of the shaft 16, so that the resilient member 30 may be mounted around the shaft 16. One end of the resilient member 30 abuts against the end surface 221.

The cover drive member 40 is a substantially hollow cylinder. An outer diameter of the follower 20 and an outer diameter of the resilient member 30 are both smaller than an inner diameter of the cover drive member 40, so that the follower 20 and the resilient member 30 can be received in the cover drive member 40. The cover drive member 40 has an open end 42 and an opposite partially-closed end 44. A diameter of the fixing portion 12 of the main body drive member 10 is smaller than a diameter of the open end 42, so that the fixing portion 12 can move in the cover drive member 40. The partially-closed end 44 defines a central aperture 442. The cover drive member 40 has two parallel flat surfaces 46 on a peripheral wall. Each flat surface 46 defines a guiding slot 48 through one end. Each sliding protrusion 26 of the follower 20 is slidably received in one corresponding guiding slot 48. The cover drive member 40 engages with the cover 310 of the foldable electronic device 300 so that the cover drive member 40 is rotatable with the cover 310.

The disk 50 is made of metal material. In the present embodiment, the disk 50 is substantially C-shaped and is clasped in the groove 162, thereby mounted with the main body drive member 10.

Figure 6:
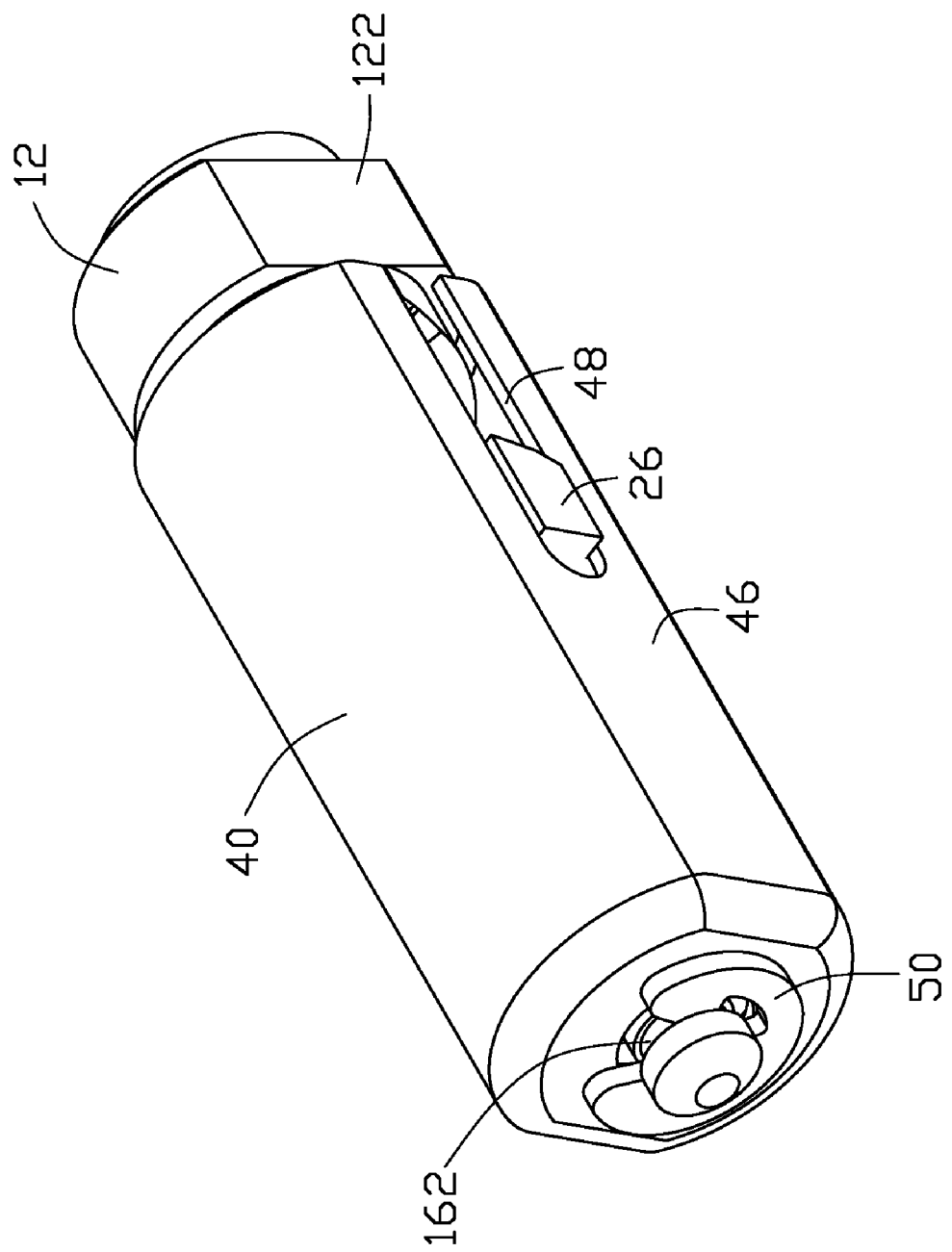
FIG. 6 is an assembled, isometric view of the hinge assembly shown in FIG. 1.

Referring to FIG. 6, in assembly, the follower 20, the resilient member 30, and the cover drive member 40 are mounted with the shaft 16 in turn. The second outer cam portion 220 of the follower 20 engages with the first outer cam portion 142 of the cam 14. The second inner cam portion 222 of the follower 20 engages with the first inner cam portion 144 of the cam 14. Each sliding protrusion 26 of the follower 20 is received in one corresponding guiding slot 48. One end of the resilient member 30 abuts against the end surface 221, and the other end of the resilient member 30 abuts against the partially-closed end 44. One end the shaft 16 travels through the hole 442, and the disk 50 is mounted in the groove 162. Thus, the hinge assemble 100 is assembled.

Referring to FIG. 7, when mounting the hinge assemble 100 with the foldable electronic device 300, the hinge assemble 100 is partially received in the hinge barrel 312. The fixing portion 12 is pushed to move towards disk 50, hence the follower 20 moves and compresses the resilient member 30. When the fixing portion 12 is moved into the cover drive member 40 and the hinge barrel 312 and faces the mounting hole 322, the fixing portion 12 becomes released and automatically moves into the mounting hole 322 due to the decompression of the resilient member 30. The main body drive member 10 engages with the main body 320, and the cover drive member 40 engages with the cover 310.

Figure 8:
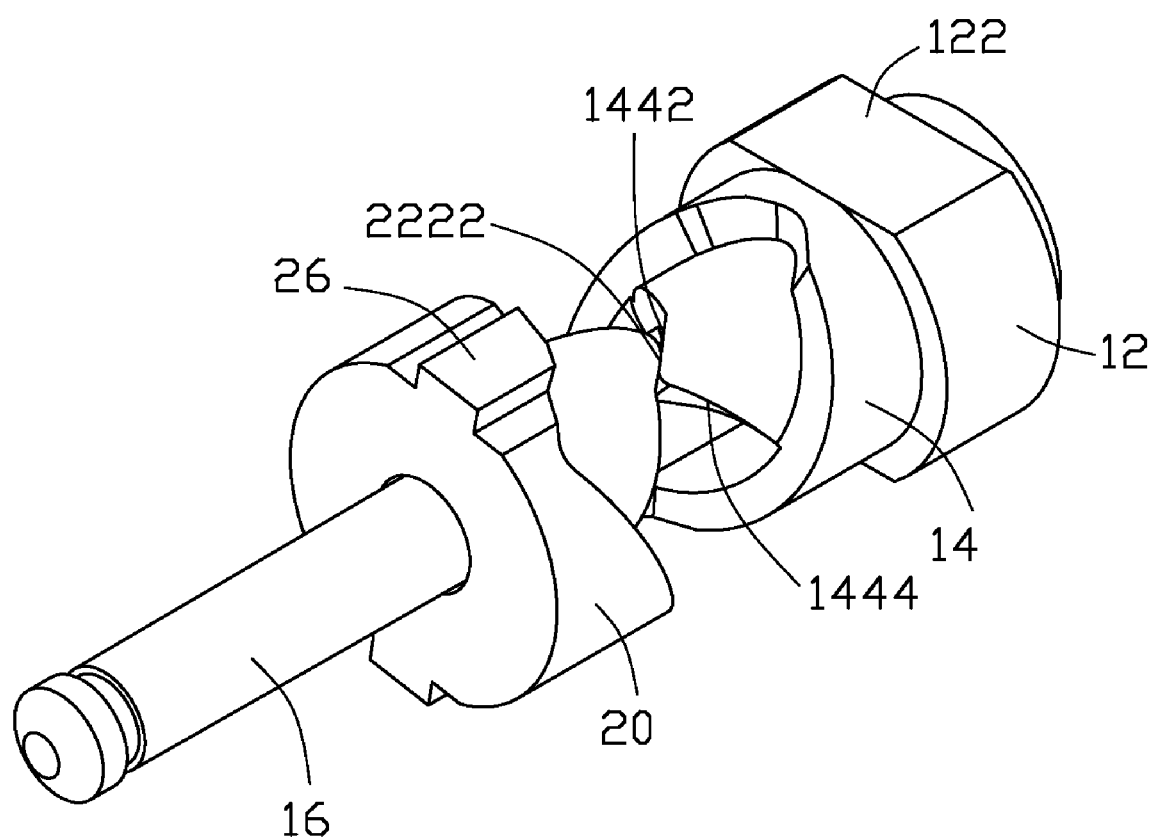
FIG. 8 is an assembled, isometric view of the main body drive member and the follower of the hinge assembly shown in FIG. 7, showing an original state of the hinge assembly.

Referring to FIG. 8, when the cover 310 is closed relative to the main body 320, the resisting slope 2222 of the second inner cam portion 222 abuts against the resisting slope 1442 of the first inner cam portion 144. The resisting slope 2202 of the second outer cam portion 220 abuts against the resisting slope 1422 of the first outer cam portion 142. The resilient member 30 is compressed to enable the cover 310 and the main body 320 to be in an original closed, stable state.

To open the foldable electronic device 300, the cover 310 is manually rotated up relative to the main body 320, hence the cover drive member 40 and the follower 20 rotate relative to the main body drive member 10 and the cam 14. The peak 2203 of the second outer cam portion 220 slides along the resisting slope 1422, the peak 2223 of the second inner cam portion 222 slides along the resisting slope 1442, and the resilient member 30 is compressed further. When the cover 310 is opened a small angle, for example, about 0 degrees and 50 degrees, the peak 2203 slides over the peak 1423 of the first outer cam portion 142, and the peak 2223 slides over the peak 1443 of the first inner cam portion 144. In the present embodiment, the original angle is about 25 degrees. At the same time, the resilient member 30 is mostly compressed. Then the cover 310 is released, the follower 20 automatically rotates relative to the cam 14 due to the decompression of the resilient member 30. The peak 2203 slides along the guiding slope 1424 into the valley 1425, and the peak 2223 slides along the guiding slope 1444 into the valley 1445. Thus, the cover 310 is automatically rotated to a fully and stable open state, about 170 degrees relative to the main body 320. The process of closing the cover 310 is reverse to the process of opening the cover 310.

The resisting slope 2222 of the second inner cam portion 222 of the present hinge assembly 100 abuts against the resisting slope 1442 of the first inner cam portion 144, and the resisting slope 2202 of the second outer cam portion 220 abuts against the resisting slope 1422 of the first outer cam portion 142. After the cover 310 is opened a small original angle, the cover 310 can automatically open relative to the main body 320. On the other hand, the cam 14 and the follower 20 respectively have inner and outer cam portions, therefore stand balanceable force during opening or closing the cover 310.

It should be understood that the cam portions of follower 20 and the cam 14 may have other shapes. The shape of the cam portion may be changed according to the open angle of the cover. For example, when changing the angle of the guiding slope, the cover may be opened over 180 degrees relative to the main body. The disk 50 may be mounted with the shaft 16 by weld.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for connecting a cover and a main body of a foldable electronic device, comprising:
    a shaft;
    a cam fixed with the shaft, one end of the cam having a substantially cylindrical first outer cam portion and a separate, substantially cylindrical first inner cam portion circumferentially surrounded by the first outer cam portion;
    a follower mounted with the shaft and adjacent to the cam, one end of the follower having a substantially cylindrical second outer cam portion and a separate, substantially cylindrical second inner cam portion circumferentially surrounded by the second outer cam portion, the second outer and inner cam portions respectively engaging with the first outer and inner cam portions; and
    a resilient member; and
    a cover drive member, the follower and the resilient member being received in the cover drive member;
    wherein the resilient member is compressed between the cover drive member and the follower to provide elastic force to make the cam portions of the follower resist the cam portions of the cam, and when the follower is manually rotated relative to the cam about a small original angle, the follower is automatically rotated relative to the cam due to the decompression of the resilient member.

2. The hinge assembly of claim 1, wherein the angle the follower rotates relative to the cam is about 0 degrees and 50 degrees.

3. The hinge assembly of claim 1, wherein the original angle of the follower relative to the cam is about 25 degrees.

4. The hinge assembly of claim 1, wherein the second outer and inner cam portions of the follower respectively have a peak, the first outer and inner cam portions of the cam respectively have a resisting slope, a peak, a guiding slope, and a valley, and each peak of the second outer and inner cam portions is adjacent to a corresponding valley of the first outer and inner cam portions.

5. The hinge assembly of claim 4, wherein the second outer and inner cam portions of the follower respectively have a beginning slope, a resisting slope, a guiding slope, and a valley, each peak of the follower is located between the resisting slope and the guiding slope, and the first outer and inner cam portions of the cam respectively have a beginning slope formed between the resisting slope and the valley.

6. The hinge assembly of claim 1, wherein the shaft has a fixing portion, and the cam is mounted adjacent to the fixing portion.

7. A foldable electronic device, comprising:
a main body;
a cover rotatably mounted with the main body; and
a hinge assembly interconnecting the cover with the main body, the hinge assembly comprising:
a shaft;
a cam fixed with the shaft, one end of the cam having a substantially cylindrical first outer cam portion and a separate, substantially cylindrical first inner cam portion circumferentially surrounded by the first outer cam portion;
a follower mounted with the shaft and adjacent to the cam, one end of the follower having a substantially cylindrical second outer cam portion and a separate, substantially cylindrical second inner cam portion circumferentially surrounded by the second outer cam portion, the second outer and inner cam portions respectively engaging with the first outer and inner cam portions; and
a resilient member; and
a cover drive member, the follower and the resilient member being received in the cover drive member;
wherein the resilient member is compressed between the cover drive member and the follower to provide elastic force to make the cam portions of the follower resist the cam portions of the cam, and when the follower is manually rotated relative to the cam about a small original angle, the follower is automatically rotated relative to the cam due to the decompression of the resilient member.

8. The foldable electronic device of claim 7, wherein the angle the follower rotates relative to the cam is about 0 degrees and 50 degrees.

9. The foldable electronic device of claim 7, wherein the original angle of the follower relative to the cam is about 25 degrees.

10. The foldable electronic device of claim 7, wherein the second outer and inner cam portions of the follower respectively have a peak, the first outer and inner cam portions of the cam respectively have a resisting slope, a peak, a guiding slope, and a valley, and each peak of the second outer and inner cam portions is adjacent to a corresponding valley of the first outer and inner cam portions.

11. The foldable electronic device of claim 10, wherein the second outer and inner cam portions of the follower respectively have a beginning slope, a resisting slope, a guiding slope, and a valley, each peak of the follower is located between the resisting slope and the guiding slope, and the first outer and inner cam portions of the cam respectively have a beginning slope formed between the resisting slope and the valley.

12. The foldable electronic device of claim 7, wherein the shaft has a fixing portion, and the cam is mounted adjacent to the fixing portion.

* * * * *